United States Patent
Bouzguarrou et al.

(10) Patent No.: US 11,941,403 B2
(45) Date of Patent: Mar. 26, 2024

(54) SELECTIVE PREDICTION BASED ON CORRELATION BETWEEN A GIVEN INSTRUCTION AND A SUBSET OF A SET OF MONITORED INSTRUCTIONS ORDINARILY USED TO GENERATE PREDICTIONS FOR THAT GIVEN INSTRUCTION

(71) Applicant: Arm Limited, Cambridge (GB)

(72) Inventors: Houdhaifa Bouzguarrou, Valbonne (FR); Guillaume Bolbenes, Antibes (FR); Thibaut Elie Lanois, Antibes (FR); Frederic Claude Marie Piry, Cagnes-sur-Mer (FR)

(73) Assignee: Arm Limited, Cambridge (GB)

( * ) Notice: Subject to any disclaimer, the term of this patent is extended or adjusted under 35 U.S.C. 154(b) by 68 days.

(21) Appl. No.: 16/906,259

(22) Filed: Jun. 19, 2020

(65) Prior Publication Data

US 2021/0397455 A1    Dec. 23, 2021

(51) Int. Cl.
*G06F 9/38*    (2018.01)
(52) U.S. Cl.
CPC .......... *G06F 9/3848* (2013.01); *G06F 9/3806* (2013.01); *G06F 9/3832* (2013.01); *G06F 9/3844* (2013.01)
(58) Field of Classification Search
CPC ..... G06F 9/3806; G06F 9/3844; G06F 9/3848
See application file for complete search history.

(56) References Cited

U.S. PATENT DOCUMENTS

| | | | | |
|---|---|---|---|---|
| 9,471,314 | B1* | 10/2016 | Bonanno | G06F 9/3848 |
| 2006/0190710 | A1* | 8/2006 | Rychlik | G06F 9/325 |
| | | | | 712/240 |
| 2008/0052501 | A1* | 2/2008 | Kwak | G06F 9/3848 |
| | | | | 712/240 |

(Continued)

OTHER PUBLICATIONS

Evers et al., "An Analysis of Correlation and Predictability: What Makes Two-Level Branch Predictors Work", 1998, pp. 52-61.*

(Continued)

*Primary Examiner* — David J. Huisman
(74) *Attorney, Agent, or Firm* — NIXON & VANDERHYE P.C.

(57) ABSTRACT

A data processing apparatus provides predictions for hard to predict instructions. Prediction circuitry generates predictions relating to predictable instructions in a stream and stores, with respect to each of the predictable instructions, a reference to a set of monitored instructions in the stream to be used for generating predictions for the predictable instructions. Processing circuitry executes the predictable instructions in the stream using the predictions. A given correlation parameter is stored between a given predictable instruction in the stream and a subset of the set of monitored instructions of the given predictable instruction to assist in generating the predictions. If the given correlation parameter is currently stored, the prediction circuitry generates a given prediction relating to the given predictable instruction based on the subset of the set of monitored instructions. Otherwise, the prediction circuitry generates the given prediction relating to the given predictable instruction based on the set of monitored instructions.

18 Claims, 8 Drawing Sheets

150

| HTP | Monitored instruction 1 | Monitored instruction 2 | Monitored instruction 3 |
|---|---|---|---|
| #A | #B | #C | |
| #F | -10 | | |
| #P | #P | #V | #W |

300

| HTP | Full set – HR[N] or GHR | Subset – HR [⊆ N] |
|---|---|---|
| #A | history(#B, #C, #D, #E) | history(#B, #C) |
| #L | history(#M, #N, #O) | |
| #P | history(#P, #Q, #T, #U, #V, #W) | history(#P, #V, #W) |

(56) References Cited

U.S. PATENT DOCUMENTS

2015/0363204 A1* 12/2015 Bonanno .............. G06F 9/3806
                                                               712/240
2018/0285108 A1* 10/2018 Sadasivam ........... G06F 9/3867
2018/0314524 A1* 11/2018 Keskin ................. G06N 3/0454

OTHER PUBLICATIONS

Thomas et al., "Improving Branch Prediction by Dynamic Dataflow-based Identification of Correlated Branches from a Large Global History", Proceedings of the 30th Annual International Symposium on Computer Architecture (ISCA'03), 2003, 10 pages.*

Zangeneh et al., "BranchNet: Using Offline Deep Learning to Predict Hard-to-Predict Branches", Department of Electrical and Computer Engineering, The University of Texas at Austin, Aug. 2019, 31 pages.*

Pan et al., "Improving the Accuracy of Dynamic Branch Prediction Using Branch Correlation", ACM, 1992, pp. 76-84.*

Stephen J. Tarsa, et al., "Improving Branch Prediction By Modeling Global History with Convolutional Neural Networks", 2nd ISCA International Workshop on AI Assisted Design for Architecture (AIDArc), Jun. 20, 2019, 6 pages.

Office Action for EP Application No. 21735377.0 dated Oct. 4, 2023, 5 pages.

* cited by examiner

```
1     int f(Array<int> m, int k) {
2             int result = 0;
3             boolean doubleresult = false;
4             int numberiterations= rand() * k;
5
6             if (numberiterations % 2 == 1) {
7                     doubleresult = true;
8             }
9
10            for(int j = 0; j < numberiterations; j++) {
11                    if (m[j] % 2 == 1) {
12                            result += m[j];
13                    }
14            }
15
16            if (doubleresult) {
17                    return (result * 2);
18            }
19
20            return result;
21    }
```

SELECTIVE PREDICTION BASED ON CORRELATION BETWEEN A GIVEN INSTRUCTION AND A SUBSET OF A SET OF MONITORED INSTRUCTIONS ORDINARILY USED TO GENERATE PREDICTIONS FOR THAT GIVEN INSTRUCTION

TECHNICAL FIELD

The present disclosure relates to data processing. More particularly, it relates to prediction for instructions.

DESCRIPTION

A data processing apparatus can use the behaviour of one or more executed instructions to make predictions about how a later instruction will behave. In this way, it is possible to inhibit certain stalls or delays that might otherwise be incurred. However, there are certain situations in which it is difficult to make such predictions. One such situation is where a variable number of intermediating instructions sit between an executed instruction, which is used to make predictions about a later instruction, and the later instruction itself. This might occur, for instance, in the case of a loop having a variable number of iterations. In these situations, it is difficult for the data processing apparatus to determine the link between the executed instructions and the later instructions and it may not be possible for a prediction to be made with accuracy.

SUMMARY

In accordance with one example configuration there is provided a data processing apparatus comprising: prediction circuitry to store, with respect to each of a plurality of predictable instructions in a stream, an absolute or relative address of a set of monitored instructions in the stream, and to use the absolute or relative address of each of the plurality of predictable instructions to generate predictions for the predictable instructions; processing circuitry to receive the predictions from the prediction circuitry and to execute the predictable instructions in the stream using the predictions; and programmable instruction correlation parameter storage circuitry to store a given correlation parameter indicative of a correlation between a given predictable instruction in the stream and a subset of the set of monitored instructions of the given predictable instruction, to assist the prediction circuitry in generating the predictions, wherein if the programmable instruction correlation parameter storage circuitry is currently storing the given correlation parameter, the prediction circuitry is adapted to generate a given prediction relating to the given predictable instruction based on the subset of the set of monitored instructions indicated in the programmable instruction correlation parameter storage circuitry, otherwise the prediction circuitry is adapted to generate the given prediction relating to the given predictable instruction based on the set of monitored instructions stored by the prediction circuitry.

In accordance with one example configuration there is provided a method of data processing comprising: storing an absolute or relative address to a set of monitored instructions in a stream; generating predictions relating to predictable instructions in the stream, wherein the predictions are generated based on the set of monitored instructions; receiving the predictions and executing the predictable instructions in the stream using the predictions; storing a given correlation parameter indicative of a correlation between a given predictable instruction in the stream and a subset of the set of monitored instructions of the given predictable instruction, to assist generation of the predictions, wherein if the given correlation parameter is currently stored, the given prediction relating to the given predictable instruction is generated based on the subset of the set of monitored instructions, otherwise the given prediction relating to the given predictable instruction is generated based on the set of monitored instructions.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: prediction circuitry to generate predictions relating to predictable instructions in a stream, wherein the prediction circuitry comprises storage circuitry to store, in respect of each of the predictable instructions, a reference to a set of monitored instructions in the stream to be used for generating predictions for the predictable instructions; processing circuitry to receive the predictions from the prediction circuitry and to execute the predictable instructions in the stream using the predictions; programmable instruction correlation parameter storage circuitry to store a given correlation parameter between a given predictable instruction in the stream and a subset of the set of monitored instructions of the given predictable instruction, to assist the prediction circuitry in generating the predictions, wherein if the programmable instruction correlation parameter storage circuitry is currently storing the given correlation parameter, the prediction circuitry is adapted to generate a given prediction relating to the given predictable instruction based on the subset of the set of monitored instructions indicated in the programmable instruction correlation parameter storage circuitry, otherwise the prediction circuitry is adapted to generate the given prediction relating to the given predictable instruction based on the set of monitored instructions indicated in the storage circuitry.

The predictions for the predictable instructions are made using a set of monitored instructions in the stream. That is, at least some of the instructions in the stream are considered in order to generate a prediction that is used to process a predictable instruction in the stream. The set of monitored instructions might be determined by, for instance, an algorithm. References to the monitored instructions are stored in the storage circuitry. Note that this prediction could be used in advance of the given instruction being executed. Programmable instruction correlation parameter storage circuitry is provided in order to store one or more correlation parameters between the given instruction and a subset of the set of monitored instructions that are ordinarily used to generate predictions for that given instruction. A given parameter could be static in that it does not evolve or change over time. When a given prediction is to be made for execution of the given predictable instruction—if a correlation parameter for the given predictable instruction is stored in the programmable instruction correlation circuitry then the subset of the set of monitored instructions is used to generate the prediction. If the correlation parameter is not stored for the given predictable instruction then the set of monitored instructions (that are referred to in the storage circuitry) is used instead. In this way, the programmable instruction correlation parameter storage circuitry is used to provide a correlation parameter that allows the set of monitored instructions to be refined to a subset of that set. By indicating the monitored instructions to be used to form the prediction, 'noise' that is caused by less relevant instructions, which might otherwise inadvertently be used to try and form predictions, can be disregarded.

In some examples, the set of monitored instructions is a set of instructions that precede the given predictable instruction in the stream. These preceding instructions are those that are executed earlier in the stream as opposed to earlier in program order. As a consequence, the preceding instructions could include the given instruction itself if, for example, the given instruction was executed earlier in the stream as part of a loop. In many cases, of course, instructions that are earlier in the stream may also be earlier in program order. It is also important to realise that program order may not correspond with execution (or stream order) in respect of out-of-order execution where instructions could be reordered in order to make better use of instruction parallelism.

In some examples, the subset of the set of monitored instructions is a strict subset of the set of monitored instructions. When the subset of the set of instructions in the stream is a strict subset of the set of instructions in the stream, there is no element in the subset that is not in the set. Additionally, the number of elements in the subset is smaller than the number of elements in the set. Consequently, the subset is a strict refinement of the number of elements that are in the set of monitored instructions.

In some examples, the subset of the set of monitored instructions excludes those of the set of monitored instructions that least strongly affect the given prediction. The subset can be produced by considering those of the instructions in the set of monitored instructions that are most likely to affect the given prediction of the predictable instruction. In other words, those instructions that least strongly affect the given prediction are excluded from the subset of the set of monitored instructions. This way, the prediction can be restricted to only considering those instructions in the stream that most contribute towards the prediction itself. Instructions that have little to no effect on the prediction are excluded from the subset as "noise".

In some examples, the programmable instruction correlation parameter storage circuitry is adapted to store the given correlation parameter by storing an indication of the given instruction and an indication of the subset of the set of instructions. In these examples, an identity of the given instruction is stored in association with an identity of the subset of the set of monitored instructions. For instance, such identities could take the form of a program counter value of the given instruction and relative or absolute instruction values for each of the instructions in the subset of the set of monitored instructions. In other examples, the subset of the set of monitored instructions could be assigned an identifier, and the identifier could be stored in association with a program counter value of the given predicable instruction. These examples have the advantage that the subset of the set of monitored instructions can be efficiently reused where other given monitored instructions in the stream are also predicted based on the same subset of the set of instructions.

In some examples, the given correlation parameter is derived externally to the data processing apparatus. In these examples, the relationship between the given instruction and the subset of the set of monitored instructions can be derived by a further data processing apparatus that is separate to the data processing apparatus being described. That is, that the correlation parameter need not determined by the prediction circuitry or the processing circuitry. This simplifies operation of the data processing apparatus, since the apparatus need only make use of the correlation parameters that have been derived and need not engage in, for instance, machine learning processes that might require the use of complex techniques such as convolution. In other embodiments, the given correlation parameter is determined internally to the data processing apparatus—e.g. by the processing circuitry and/or the prediction circuitry. An internal determination may occur in a situation where Just-in-Time (JIT) compilation is performed. This refers to a technique in which a data processing apparatus has access to source code or byte code of a program to be executed such that the structure of the program to be executed can be analysed as a whole. Such a situation makes it possible to draw inferences regarding the relationship between different instructions and so at a time where the final compilation is performed, the data processing apparatus can be in a position to infer the correlations.

In some examples, the given correlation parameter is derived by static analysis of the instructions. Static (program) analysis involves the analysis of a program without the program being executed. Typically, static analysis is performed on source code or byte code of a program rather than the object code into which the source code or byte code is compiled. Since static analysis takes place using the entirety of the code, it is possible to analyse the structure of the code as well as the relationship between elements within that code. Furthermore, static analysis of a program makes it possible to infer relationships between particular operations. For example, an almost infinite number of variable names are available in source code. The presence of these variable names makes it possible to infer relationships between instructions. In contrast, when the source code is compiled to object code, the variable names are abstracted away and operations are instead performed using a very limited number of registers. Due to this abstraction, it becomes significantly more difficult to infer relationships between operations—particularly when only some of the operations may be visible at any time. In addition, the nature of source code is that particular program structures can be expressed more compactly than might be the case in object code where management that may be performed on particular items of data (e.g. moving data between memory and registers) obfuscates those structures. Consequently, static analysis has the advantage that it can be easier to detect relationships between instructions and thereby more easily determine relevant monitored instructions that are more likely to contribute to the behaviour of a later predictable instruction. By determining these relationships and providing correlation parameters that reflect such a relationship to the prediction circuitry, it is possible to narrow the set of monitored instructions that are being considered for predictions to a subset of those monitored instructions. As such, the number of situations where a prediction can be made can be increased with such predictions being more accurately made.

In some examples, the given correlation parameter is derived by profiling of the instructions. Profiling of instructions can be achieved by executing a program or part of the program in controlled circumstances (e.g. where variables can be carefully controlled). By careful execution of the program while controlling such variables, it is possible to use techniques such as machine learning or convolution in order to quantify the relationship between instructions. Such quantification might be reflected by a convolution matrix, for instance, which can continue to be refined as well as be applied to current state of a data processing apparatus in order to make predictions. In the present techniques, however, the relationship between the instructions is instead expressed by a simplified correlation parameter, which indicates that a given instruction is dependent on a subset of other monitored instructions. This information can be provided to the prediction circuitry in order to refine the set of instructions down to a subset of instructions for the use in making predictions. By providing a simplified correlation parameter in this way, it is not necessary for large amounts of data (such as convolution matrices) to be provided by the data processing apparatus. Furthermore, there is no need for the data processing apparatus to interpret or continue to evolve such data. Instead, the correlation parameter can directly be used to refine the set of monitored instructions that are considered for predictions of predictable instructions.

In some examples, the prediction circuitry comprises control flow prediction circuitry; the predictable instructions comprise control flow instructions; and the predictions are generated based on a set of the control flow instructions in the stream. Control flow instructions can be used in order to affect the flow of a program that is being executed. Ordinarily, instructions might be executed sequentially. However, certain instructions can be used in order to alter this flow such that instructions at a non-sequential location are executed. Such control flow instructions can be conditional in that they might or might not be executed. Control flow prediction circuitry can be provided in order to predict the existence of such control flow instructions in a block of instructions, whether any control flow instructions are likely to be taken or not, and/or what the likely target of such a control flow instruction is likely to be. This can be advantageous, since pipelining makes it possible to fetch and decode (for example) instructions while other instructions are being executed. Without control flow prediction, it is entirely unknown where future instructions will be executed from. Consequently, it would not be possible to fetch and decode instructions until such time as any control flow instructions had been resolved. This would result in a stall of the execution pipeline, which is undesirable. Control flow predictions can therefore be made to predict where the program will flow to, and to continue fetching and decoding in that direction while any control flow instructions are resolved. If the prediction was correct, a stall has been averted. Otherwise, a "rewind" takes place, and the program is simply at the state that it would have been if no prediction took place. Predictions of this nature can be made based on the outcome of other executed control flow instructions in the program. For instance, the prediction circuitry might base its prediction on a set of previously executed control flow instructions. However, trying to determine which of those previously executed control flow instructions are relevant can be difficult—particularly in the presence of variable "noise" (e.g. if the distance between the relevant instructions and the predictable instruction keeps changing). The present technique receives correlation parameters that indicate relationships between the later predictable instruction and a subset of the previously executed instructions and this subset of instructions (rather than the set of instructions) would be used to make a prediction of the later instruction, thereby allowing noise to be disregarded.

In some examples, the prediction circuitry comprises branch prediction circuitry; the instructions comprise branch instructions; and the predictions are generated based on a set of the branch instructions in the stream. One particular example of a control flow instruction is a branch instruction. For these, a branch prediction circuit may be provided in order to predict the existence, outcome, and/or target of a particular branch instruction.

In some examples, the predictions are generated based on a global history register that comprises an indication of outcomes of the set of the control flow instructions. One particular technique that is used in branch prediction is reference to a global history register (GHR). The GHR can be used store outcomes of previously executed branch instructions in the program. The GHR could consider, for instance, a sliding window of the previous twenty outcomes of branch instructions. Since the outcome of branch instructions affects the sequence of code that is executed, one might expect the outcome of executing the same sequence of branch instructions to cause later branch instructions to have a consistent outcome. In this way, it is expected that the outcome of a particular branch instruction is heavily influenced by the path taken to get to that branch instruction—the path being expressed by the outcome of previously executed branch instructions. However, it will also be appreciated that not all previous branch instructions will be relevant. In particular, the execution of irrelevant (monitored) branch instructions (e.g. those that cause code to be executed that is irrelevant to a later predictable instruction) still affects the value of the GHR. However, being irrelevant, the later predictable instruction is unaffected by whether these branch instructions are executed or what their outcome is. Consequently, by providing the subset of branch instructions, it is possible to limit the entries of the GHR that are used for predictions to predictable branch instructions so that only those previous monitored branch instructions that are most relevant are considered for the predictions.

In some examples, the branch prediction circuitry comprises: instruction branch prediction circuitry to generate the given prediction relating to the given predictable instruction based on the subset of the set of monitored instructions; and further instruction branch prediction circuitry to generate the given prediction relating to the given predictable instruction based on the set of monitored instructions. In these examples, dedicated prediction circuitry is used for predictions that are made using the subset of monitored instructions. Such circuitry can be optimised and made light weight in view of the fact that a smaller number of input parameters are used in order to generate the prediction. In other embodiments, the same branch prediction circuitry is used for situations where the subset of the set of instructions is used and where the set of instructions is used.

In some examples, the prediction circuitry comprises data prediction circuitry; and the predictions are of data that is loaded or stored by the instructions. Data prediction is a technique in which the data value that is to be used by a given instruction is predicted before the value is known. This could be the case, for instance, where a number of preceding instructions are used to generate the data value that is then "consumed" by the later instruction. For instance, a technique such a VTAGE forms predictions of data based on values of the GHR. Data prediction circuitry could take the form of a table in which a program counter value for an instruction is associated with a GHR value and a data value, and a confidence with which that data value will be used again by that instruction when the current GHR value matches what is stored in association with the data value. By considering the correlation parameter, it is possible to refine the set of instructions that are considered for making the prediction so that rather than considering all instructions that make up the GHR value, only a subset of those instructions are considered.

In some examples, the processing circuitry comprises prefetch circuitry to prefetch data from a storage circuitry; the prediction circuitry comprises prefetch training circuitry to train the prefetch circuitry; the instructions are memory access instructions; and the predictions are of an address at which a load or store operation is to be performed by the memory access instructions. Prefetching refers to a technique in which data is proactively fetched from memory (into, e.g. a cache) before it is explicitly requested by an instruction. Since memory typically has a long latency as compared to the time taken to execute an instruction, this saves a large delay that may be encountered when data is explicitly requested from the memory. Prefetching relies on prediction in the sense that the prefetching circuitry predicts that a particular memory address will be accessed before it is explicitly accessed by an instruction. Prefetchers typically make predictions by detecting patterns in the explicitly requested data and fetching data based on those detected patterns. However, since a large number of explicit memory accesses may be made, it is often difficult for prefetching circuitry to determine which previous memory accesses are most likely to affect future memory accesses. By providing the previously mentioned correlation parameter, it is possible to refine the set of monitored instructions that are used for determining access patterns—thereby enabling the prefetcher to detect the correct pattern with higher probability.

There are a number of ways in which correlation parameter can be provided to the prediction circuitry in order to reduce the set of monitored instructions that are used for generating predictions. In some examples, the data processing apparatus comprises: further execution circuitry, responsive to one or more correlation parameter providing instructions in the stream, to store the given correlation in the programmable instruction correlation parameter storage circuitry. These correlation parameter providing instructions are executed by the further execution circuitry in order to store a given correlation parameter in the programmable instruction correlation parameter storage circuitry. One way in which such correlation parameter providing instructions can be provided is by a compiler. As previously described, a compiler might be able to use static analysis in order to determine where such correlations exist. These correlations can then be provided as part of the program in the form of correlation parameter providing instructions. In addition, such correlation parameters could be provided explicitly by the programmer at a time that source code is written. In particular, the programmer could be aware of relationships between instructions in the program and could therefore provide hints that are interpreted by the compiler and causes one or more correlation parameter providing instructions to be provided as part of the object code.

In some examples, at least some of the correlation parameter providing instructions comprise a field to specify a reference at least one of the given instruction and the subset of instructions. Such fields could provide an explicit reference to the given instruction and/or to the subset of instructions that make up the correlation parameter. The field could also allow for a pointer to be provided, which points to a location where this information is provided.

In some examples, the data processing apparatus comprises: correlation parameter pointer storage circuitry to provide a pointer to a location in storage circuitry where the correlation parameter is provided; and in response to a trigger, the storage circuitry is accessed based on the location and the correlation parameter is loaded into the programmable instruction correlation parameter storage circuitry. In such examples, the pointer can be used to refer to a location in storage circuitry (such as a memory) where one or more correlation parameters are provided. Then, a trigger causes the storage circuitry to be accessed at the location pointed to the by the pointer such that the correlation parameter is loaded into the programmable instruction correlation parameter storage circuitry. Such a configuration is amenable to a situation where dynamic program analysis takes place in order to determine the correlations. In particular, if dynamic program analysis is performed by an apparatus that is external to the external data processing apparatus, one way in which correlation parameters can be provided is by providing them to a shared memory. The trigger, which could be a change in the pointer value (which could occur at the time of a context switch for instance) causes the correlation parameters to be reloaded. Such a trigger could therefore be an explicit instruction that the pointer has been updated or that the correlation parameters that are stored at the location that is pointed to by the pointer have been changed. This technique makes it possible to provide the correlation parameters 'live' rather than at compile time.

In some examples, the storage circuitry is adapted to store a plurality of correlation parameters at the location; in response to the trigger, at least some of the correlation parameters are accessed; and the data processing apparatus comprises cache circuitry to store the at least some of the correlation parameters in response to the at least some of the correlation parameters being accessed. Although storage circuitry, such as memory, can be used to store a larger number of correlation parameters than might be possible in the programmable instruction correlation parameter storage circuitry, some storage circuits (such as memory) have a long latency. Hence, the loading of correlation parameters from a main memory into the programmable instruction correlation parameter storage circuitry could be slow. By providing cache circuitry, such latency can be reduced while still enabling correlation parameters to be swapped in and out of the programmable instruction correlation parameter storage circuitry. This could occur, for instance, at the time of a context switch.

Particular embodiments will now be described with reference to the figures.

Figure 1:
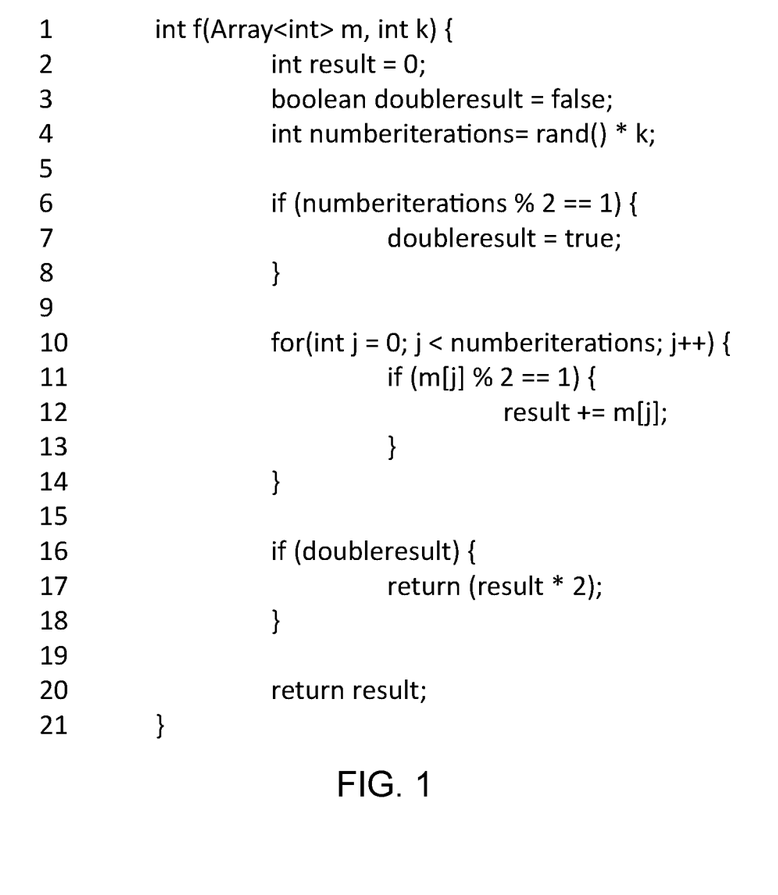
FIG. 1 shows code that can result in Hard to Predict (HTP) instructions.

FIG. 1 illustrates a part of an example program in the form of a function f in which the use of some (monitored) instructions in order to create a prediction for a later (predictable) instruction is problematic. The function takes two inputs—an array of integers (m), and an integer (k) that indicates the number of elements within that array. At line 4, the variable numberiterations is set to a random number between 0 and k. This variable is used to iterate through a random number of the elements of the array m. At lines 6 to 8, it is determined whether numberiterations is odd. If so, the variable doubleresult is set to true and otherwise it remains as false. The variable doubleresult will cause the final result at the end of the function to be doubled if numberiterations is odd. Lines 10 to 14 define a loop. In particular, the loop iterates through the array m a number of times equal to numberiterations. At each iteration, the next element in the array is accessed. For each element, if that element is odd, then the value of that element is added to a variable result. Otherwise, the variable result remains unchanged. Once the loop has completed, lines 16 to 18 then check the variable doubleresult. If doubleresult is set to true, then the result that was calculated in the loop of lines 10 to 14 is doubled. In any event, the result (doubled or not) is returned at line 20.

It will be understood that each 'if' and 'for' statement results in conditional code, which is therefore implemented via a control flow instruction such as a branch instruction. Such control flow instructions therefore occur as a consequence of instructions at lines 6, 10, and 16 for instance.

One way in which prediction can be used in this program is to determine whether the branch at line 16 is to be taken or not. From a static review of the source code, it is clear that the answer is entirely dependent on the result of executing lines 6 to 8. Consequently, a prediction can indeed be made for this branch based on the execution of previous instructions. However, it will be appreciated that firstly this analysis is possible as a consequence of the source code being available. In contrast, during typical execution of a program, the source code might not be available. In an execution environment in which the source code is not available, only a very small number of these instructions may be visible at any time. Secondly, the number of instructions that are executed as part of the loop of lines 10 to 14 is random. Consequently, when considering a stream of instructions, which is typically what will be present during execution, the apparatus cannot easily determine a link between the outcome of this branch instruction and the outcome of a branch x instructions ago, because x keeps changing. That is, the loop of lines 10 to 14 creates a variable "noise" that obfuscates the relationship between these elements. Consequently, many branch prediction mechanisms will fail to produce a branch prediction of the Hard to Predict (HTP) branch instruction at line 16.

It will be appreciated that a similar situation can arise for prediction techniques such as data prediction and prefetching. In particular, if a random sized "noise" occurs between first instruction(s) and second instruction(s) whose execution is dependent on the first instruction(s) then when analysing the stream of instructions, the relationship becomes very difficult to determine. For instance, in one execution of function f, the distance between the branch that occurs from instruction 6 and the branch that occurs from instruction 16 could be 3 branch instructions. In another execution of function f, due to the variable number of iterations for the loop at line 10, this could be 50 branch instructions. A branch prediction will therefore find it very difficult to determine which instructions are indicators of the outcome of the branch from the instruction at line 16. Prediction mechanisms are therefore likely to work poorly or not at all.

Figure 2:
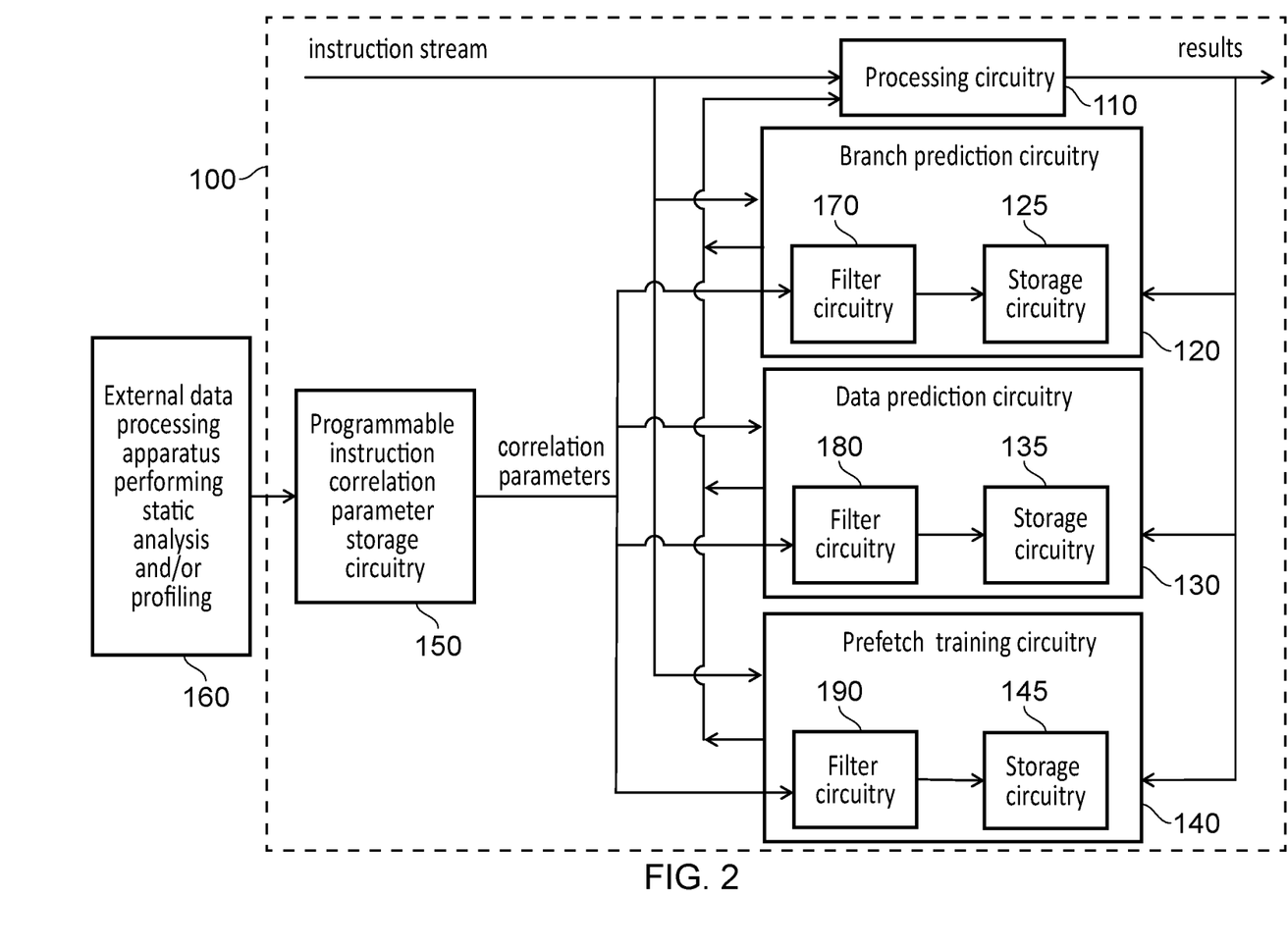
FIG. 2 illustrates an example apparatus in accordance with some embodiments.

FIG. 2 illustrates an apparatus in accordance with some embodiments. The apparatus 100 includes processing circuitry 110 that processes a stream of instructions. The instruction stream may include, for instance, control flow instructions (such as branch instructions), and data access instructions (such as load/store instructions). The processing circuitry 110 processes these instructions and produces one or more results. The results are passed to branch prediction circuitry 120, data prediction circuitry 130, and prefetch training circuitry 140. These prediction circuits 120, 130, 140 consider whether any of these results could be used to make future predictions and candidates for future predictions are stored in the storage circuitry 125, 135, 145 of each prediction circuit 120, 130, 140. These candidates can be refined/assessed and/or used to produce predictions for future predictable instructions. The predictions can then be passed back to the processing circuitry 110 in order to more efficiently execute the predictable instructions. For instance, the predictions made by the branch prediction circuitry 120 can be used to predict the outcome of a branch instruction so that instructions at the predicted path can continue to be fetched, decoded, and issued while the branch is being resolved. The data prediction circuitry 130 can be used in order to predict a particular value used by an instruction before that value has been fully calculated, and the prefetch circuitry 140 can be used in order to predict, from one instruction, data that will be required by a later instruction so that the data can be fetched in memory in advance of it being explicitly requested thereby reducing the effective memory latency. Typically, these prediction circuits 120, 130, 140 will observe results provided by the processing circuitry 110 for monitored instructions that are indicated by the storage circuitry 125, 135, 145 and, over a period of time, will use these results to make predictions for the execution of later instructions.

In these examples, apparatus 100 includes programmable instruction correlation parameter storage circuitry 150 that stores correlation parameters between instructions in the stream. In particular, in relation to a predictable instruction, the programmable instruction correlation parameter storage circuitry 150 could store references to one or more other (monitored) instructions for which a correlation exists. Information regarding these correlation parameters is passed to filter circuits 170, 180, 190 in order to filter the set of monitored instructions that are used for producing the predictions by the prediction circuits 120, 130, 140. The correlation parameters are, in this example, provided by an external data processing apparatus 160 that performs static analysis and/or profiling of the instructions that make up the instruction stream.

By providing hints to the filter circuits 170, 180, 190 of relations that are known to exist, it is possible to better guide the prediction circuits 120, 130, 140 as to the instructions that they should be monitoring in order to make their predictions. In the example of FIG. 1, the correlation parameter data would indicate that there is a correlation between the branch taken at line 6 and the outcome of the branch at line 16. In this situation, for the given instruction at line 16, the set of monitored instructions that might ordinarily be considered by branch prediction circuitry 120 (as indicated by data stored in the storage circuitry 125) could be all branch instructions that have been executed within the function f. The subset of monitored instructions will be the single branch instruction on line 6. The filter circuitry 170 therefore causes only this relationship to be considered when making predictions. The branch prediction circuitry 120 is therefore able to better see a pattern between the outcome of the instruction at line 6 and the outcome of the predictable instruction at line 16. The "noise" caused by the variable number of branches that occur from the loop on lines 10 to 14 of FIG. 1, is therefore filtered out and so the quality of the branch prediction increases.

The exact process used by the external data processing apparatus 160 is not material to the present disclosure. Techniques such as static or dynamic analysis can be used by compilers and/or profiling tools. A specific technique for performing static or dynamic analysis to determine correlations can be found in "Improving Branch Prediction by Modeling Global History with Convolutional Neural Networks" by Stephen J. Tarsa et al, presented at the $2^{nd}$ ISCA International Workshop on AI Assisted Design for Architecture on June 2019, Phoenix, AZ, USA. This technique involves the use of Convolutional Neural Networks (CNNs). Tuples comprising hashed (one-hot) instruction pointer values and directions are taken from the global history sequence and converted into algebraic vector representations. One way in which the output of this technique can be converted into the claimed correlation parameters is that the parameters indicate that a correlation between a predictable branch instruction and a monitored instruction exists when the magnitude of the input weight that is trained for the monitored instruction exceeds a given threshold value (e.g. 0.5) when assessing when the predictable branch instruction is taken.

It will of course be appreciated that although FIG. 2 illustrates multiple prediction circuits 120, 130, 140, it is possible that only a single prediction circuit could be provided or indeed that multiple prediction circuits could be provided in a combination other than that illustrated in FIG. 2.

Figure 3:
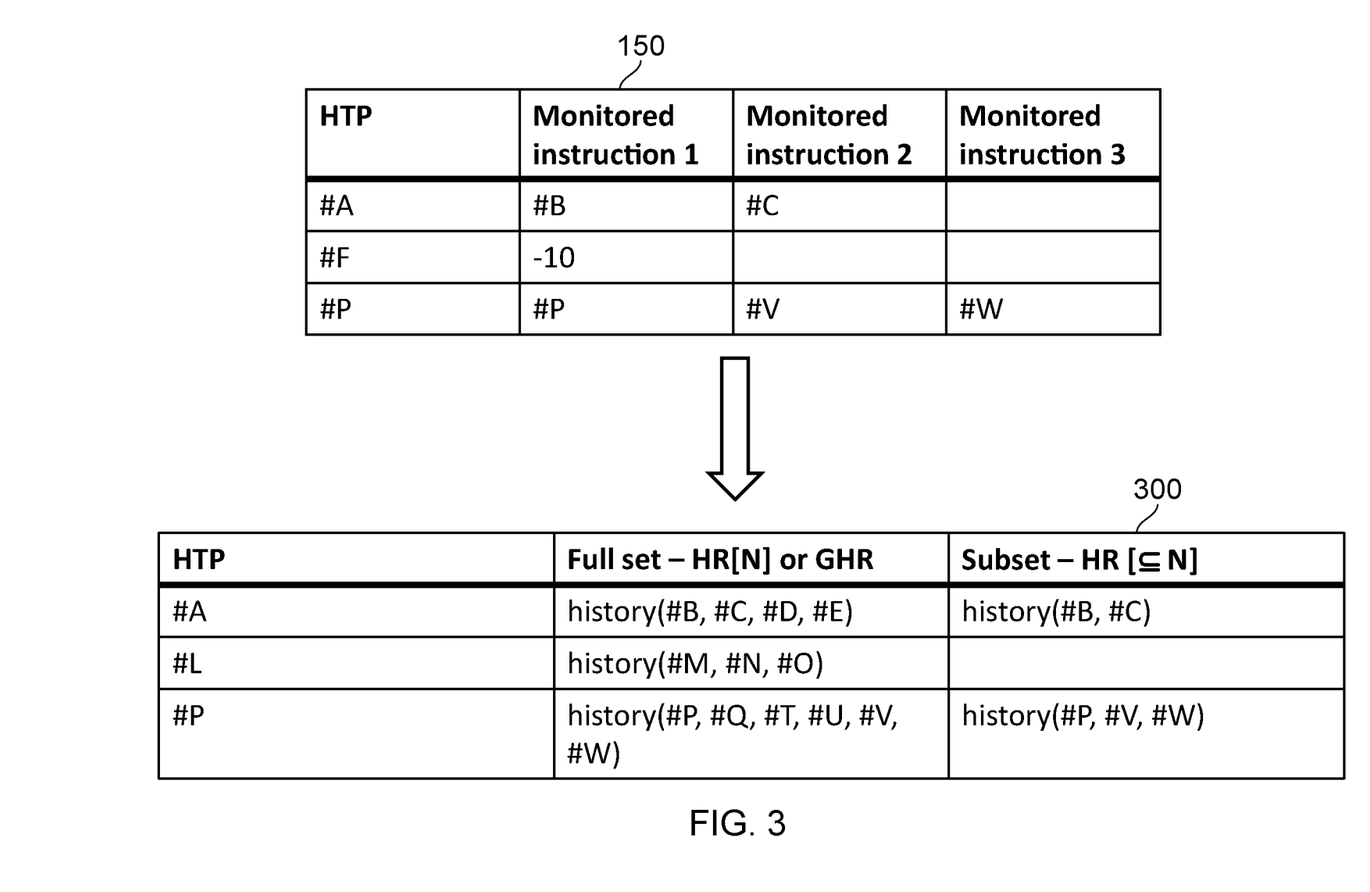
FIG. 3 shows how a set of correlations can be used to refine a set of monitored instructions used for predicting the outcome of an HTP instruction to a subset of that set of monitored instructions in accordance with some embodiments.

FIG. 3 illustrates an example of the programmable instruction correlation parameter storage circuitry 150. This indicates, for each Hard to Predict (HTP) instruction at program counter values #A, #F, #P, a set of monitored instructions (such as monitored branch instructions) for which a correlation is believed to exist. Note that this technique does not involve the use of any weights or any intermediate training data as might be generated during the process of determining the correlations (such as via machine learning). Instead, the correlation parameters merely specify the instructions involved in the correlation. The present process is therefore much more efficient, since it involves significantly less data being stored and since it does not require the application of a complex neural network (or other machine learning algorithm) to make use of the correlation information in order to provide predictions.

In the present examples, the programmable instruction correlation parameter storage circuitry 150 stores three correlations. A first correlation is between HTP instruction at program counter value #A and monitored instructions at program counter values #B and #C. The program counter values need not be absolute values. For instance, the predictable HTP instruction at program counter value #F is correlated to a monitored instruction whose memory address is 10 bytes earlier than the instruction at program counter value #F. In addition, programmable instruction correlation parameter storage circuitry 150 also indicates a third correlation, which is between the predictable instruction at program counter value #P and the monitored instructions at program counter values #P, #V and #W. In this latter example, note that the HTP instruction is correlated to itself. This could occur, for instance, in the case of a loop where an instruction may be executed multiple times. In this situation, the instruction can be correlated to itself, because instruction at program counter value #P could occur earlier in the stream as a result of an earlier iteration of the loop. Accordingly, the instruction's own outcome can affect an outcome of that instruction in a later iteration. The correlations being provided, therefore, indicate those instructions that are most relevant to the predicted outcome of an HTP instruction (or, alternatively, exclude the least relevant instructions that are part of the set of instructions used to produce a prediction).

The table 300 illustrates how these correlation parameters can be used in order to influence predictions. In particular, for a predictable instruction at program counter value #A the full set of history data HR(N) as represented, for instance, by a Global History Register (GHR) could be derived by considering a history of each of the monitored instructions at addresses #B, #C, #D and #E. This set of instructions (which could, for instance, be a determined subset of instructions that have been previously executed) is stored in the storage circuitry 125 of a prediction circuit 120 and is used where there is no entry in the programmable instruction correlation parameter storage circuitry 150 for instruction #A as an HTP instruction. However, where the entries of the programmable instruction correlation parameter storage circuitry 150 correspond with those illustrated in FIG. 3, the prediction for the instruction at program counter value #A is instead determined by considering the history of branches at program counter values #B and #C. These two branch instructions therefore make up a subset of the full set of monitored instructions that are considered.

The table 300 also illustrates an example for an HTP instruction at a program counter value #L. In this situation, the full set of instructions have been determined as monitored instructions at program counter values #M, #N, and #0 (as is stored in the storage circuitry 125). However, in this situation, the programmable instruction correlation parameter storage circuitry 150 does not store a value for the predictable HTP instruction #L. Consequently, no subset is defined and so this set of instructions (#M, #N, and #O) is used for generating a prediction. Table 300 also illustrates a third example HTP instruction at program counter value #P. Here, the set of monitored instructions comprises those at program counter values #P, #Q, #T, #U, #V, and #W. Meanwhile, the subset of instructions (as defined by the programmable instruction correlation parameter storage circuitry 150) means that predictions are generated using only the history of the monitored instructions found at program counter values #P, #V and #W.

Accordingly, it can be seen how a set of monitored instructions that is ordinarily determined and used for predicting the outcome of a particular HTP branch instruction can be narrowed to a subset of those instructions. In this way, it is possible to consider only those instructions for which a correlation exists, and thereby more reliably produce predictions for HTP instructions.

Figure 4:
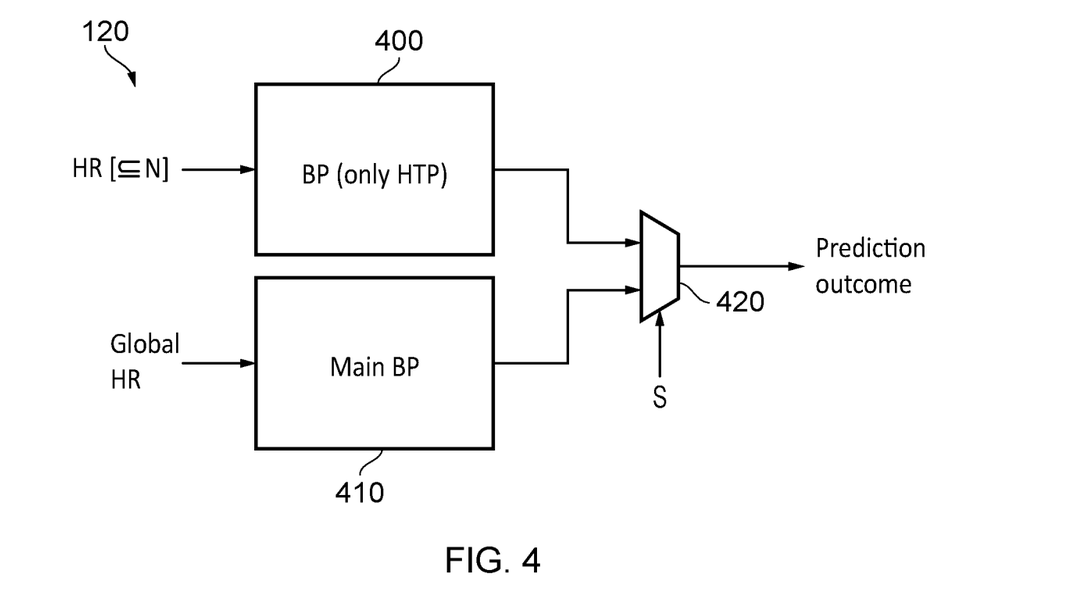
FIG. 4 shows an example of prediction circuitry in accordance with some embodiments.

FIG. 4 illustrates an example of how the prediction circuitry could be configured. In the example of FIG. 4, the prediction circuitry takes the form of branch prediction circuitry 120. In this example, first instruction branch prediction circuitry 400 is provided for generating predictions for HTP instructions when a correlation for those HTP instructions is available in the programmable instruction correlation parameter storage circuitry 150. The first instruction branch prediction circuitry 400 takes, as an input, a history of the subset of branch instructions that are indicated by the correlation in order to generate the prediction. For instance, when generating a prediction for instruction #P (in FIG. 3), the history of monitored instructions #P, #V, and #W, such as whether those instructions have been taken or not, is taken as inputs.

For other instructions (e.g. where a correlation is not provided in the programmable instruction correlation circuitry 150) the GHR is used as an input to a second instruction branch prediction circuitry 410. The outputs from each of the branch prediction circuitries 400, 410 are provided to a multiplexer 420 to produce a final prediction value. A switching signal (S) is provided to select between the outputs of each of the branch prediction circuitries 400, 410. For instance, where a correlation is provided by the programmable instruction correlation parameter storage circuitry 150, the selection signal S will select the output from the correlated instruction branch prediction circuitry 400.

Of course, there are other variants of this configuration that are possible. For instance, although static or dynamic analysis of the instruction stream may reveal a correlation between instructions, it is possible that this correlation may be incorrect or may not work well. In these situations, it may be desirable to use both branch predictors 400, 410 simultaneously in order to produce two predictions—one using a history of the set of instructions as an input and one using a history of the subset of instructions as an input. Here, a confidence that is produced for each of the predictions produced by the two prediction circuits 400, 410 can be used to inform the selection signal S. Consequently, the prediction that is found to be reliable can be selected. It will be appreciated that other configurations that make use of other branch predictions simultaneously can also be used. In these situations the multiplexer 420 may be expanded to accommodate these further possible inputs and the selection signal S will be capable of distinguishing between these.

Figure 5:
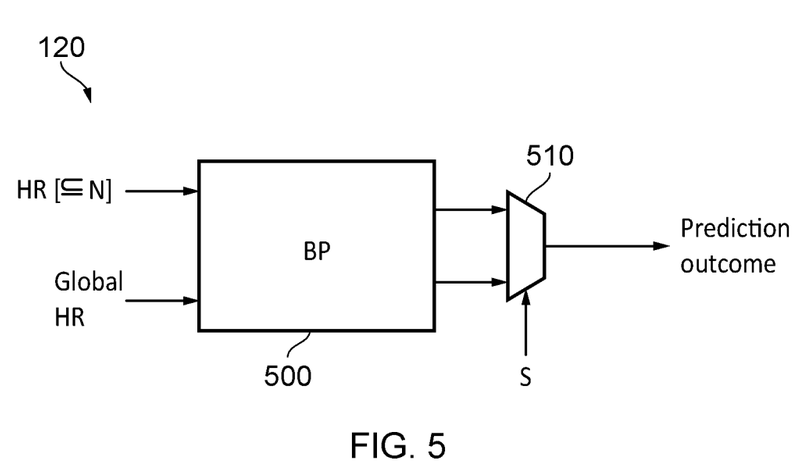
FIG. 5 shows an example of prediction circuitry in accordance with some embodiments.

FIG. 5 illustrates an alternative configuration of the prediction circuitry. In this example, again, the prediction circuitry takes the form of branch prediction circuitry 120. In this example, a single branch predictor 500 is provided for predictable HTP instructions where correlation parameter information is and is not stored in the programmable instruction correlation parameter storage circuitry 150. The branch predictor 500 of these examples can therefore be configured to accept different inputs depending on whether the correlation parameter information is available or not.

In embodiments in which predictions are generated using the set of monitored instructions and the subset of the set of monitored instructions, the branch prediction circuitry can be executed twice in order to produce the two predictions—each execution using a different input. Once again, two outputs are provided to a multiplexer 510 that uses a switching signal S in order to select one of these predictions for use as the final prediction.

Figure 6:
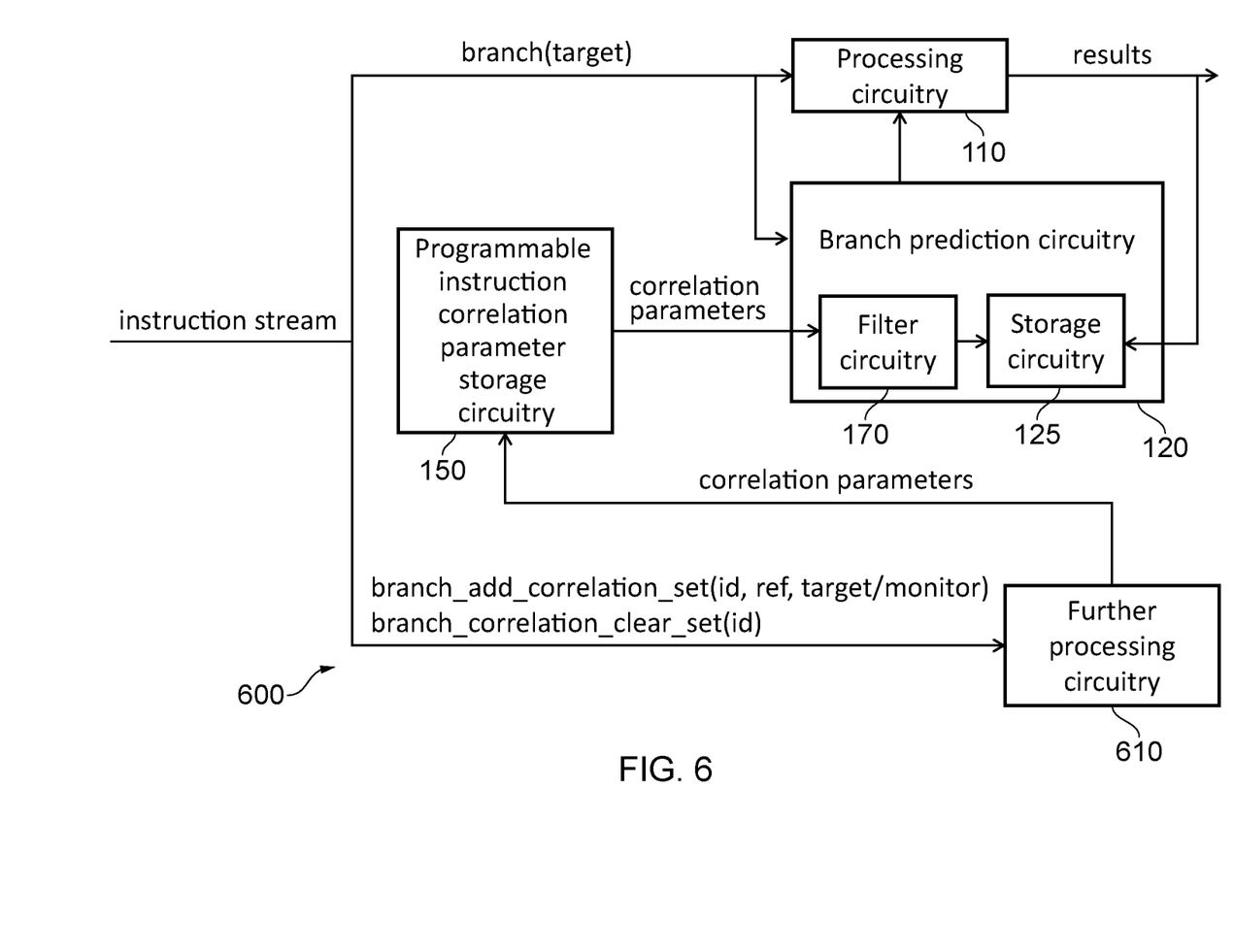
FIG. 6 schematically illustrates an example of an apparatus that receives correlations via an instruction stream in accordance with some examples.

There are a number of ways in which the correlations can be provided with a programmable instruction correlation parameter storage circuitry 150. In some examples, as illustrated in FIG. 6, the instruction stream itself comprises a number of correlation parameter addition instructions. These are processed by further processing circuitry 610, which provides the correlations to the programmable instruction correlation parameter storage circuitry 150 for use by prediction circuits such as the branch prediction circuitry 120 as previously described. FIG. 6 illustrates an example of two such instructions. The first instruction, a branch_add_correlation_set instruction, comprises three fields. The first field specifies an ID number for the particular correlation parameter. The second field specifies a reference such as a memory address, and the third field is a flag indicating whether the reference is a target (e.g. an HTP instruction) or relates to an instruction that is to be monitored for predicting an HTP instruction. For instance, the following instruction:

branch_add_correlation_set (3, 0x10000016, 0)

indicates that a correlation parameter is being defined. The correlation parameter is referred to as an ID number 3 and an instruction at memory address 0x10000016 (which is being corresponded to line number 16 above, for convenience) is specified as a target (e.g. the HTP instruction). A further instruction could be issued in the form:

branch_add_correlation_set (3, 0x10000006, 1)

which indicates that the instruction at memory address 0x10000006 (which is being corresponded to line number 6 above, for convenience) is added as an instruction to be monitored as part of this correlation (correlation ID 3). This would therefore correspond with the example given in FIG. 1 in which the branch instruction at line 16 is dependent on the outcome of the monitored branch instruction at line 6. The result of executing the branch at line 6 can then be used to predict a future outcome of the branch instruction at line 16 while disregarding the branch instructions that are generated randomly by the loop between lines 10 and 14 in FIG. 1, which form "noise".

A further branch_correlation_clear_set instruction is used to clear the correlation from the programmable instruction correlation parameter storage circuitry 150 and can be used when the correlation is no longer required. This could occur in, for instance, the case of a context switch for instance. The instruction comprises a field to indicate the correlation that is no longer required. For instance:

branch_correlation_clear_set (3)

would indicate that the above correlation parameter (between the HTP instruction at line 16 and the branch at line 6) was no longer required.

These instructions can be added to the instruction stream at a time of compilation, which may be performed by an external processing apparatus. Advantageously such information can be added at a compilation time since this is a point where the source code is used to generate the instruction stream is available. Consequently, this enables static analysis to be performed on the source code, which as previously demonstrated makes it possible to more easily spot correspondences between instructions.

Figure 7:
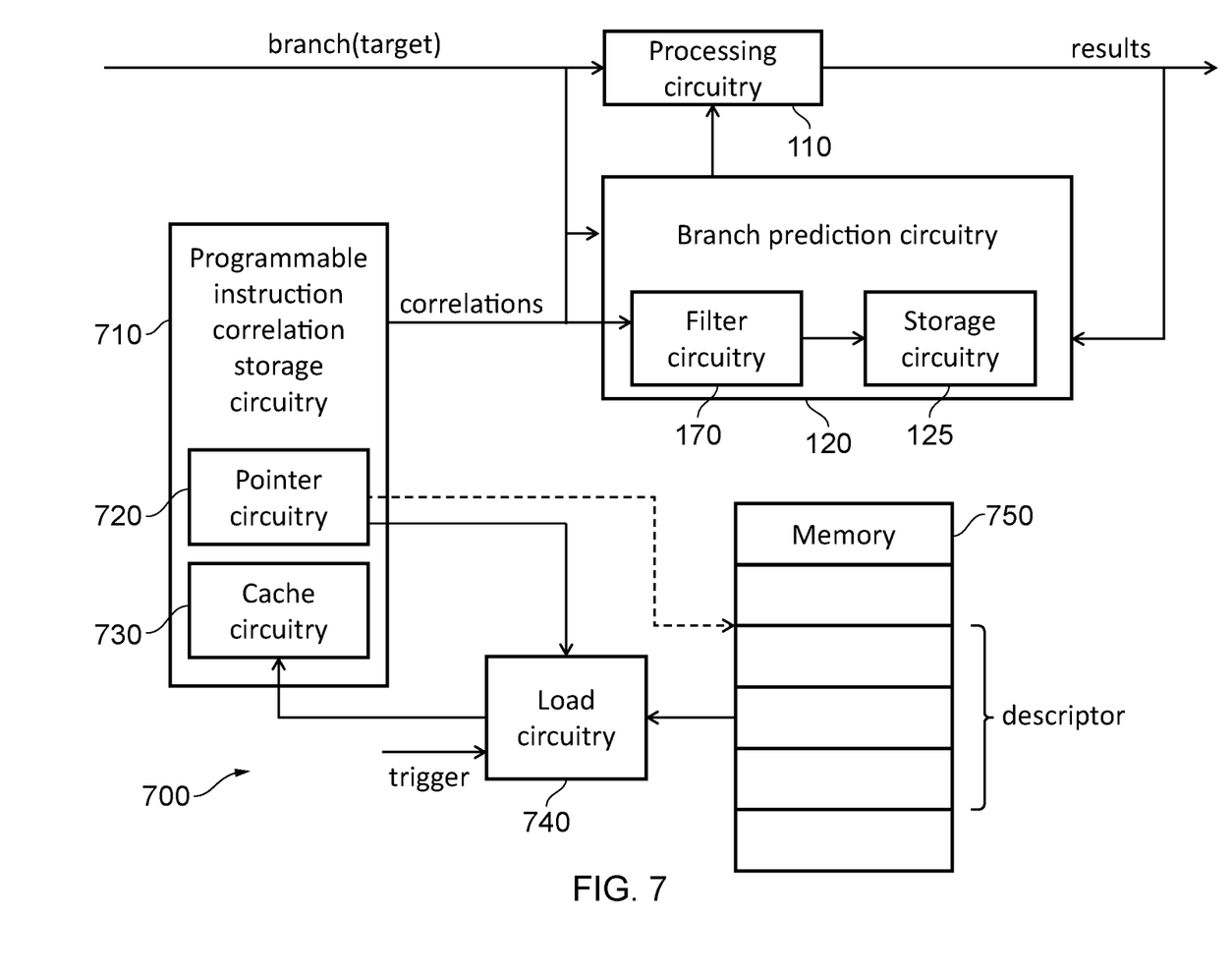
FIG. 7 schematically illustrates an example of an apparatus that receives correlations via descriptors in a memory in accordance with some examples.

FIG. 7 illustrates a further example of how the correspondences can be provided. In this example, the programmable instruction correlation parameter storage circuitry 710, which closely corresponds with the programmable instruction correlation parameter storage circuitry 150 described with reference to FIG. 2, additionally includes pointer circuitry 720. The pointer circuitry 720 comprises a pointer that refers to an area of memory 750 at which a descriptor is stored. In response to a trigger, load circuitry 740 reads the pointer stored in the pointer circuitry 720 and uses this to load the descriptor that is stored in the memory 750. At least some of the descriptor can be stored into cache circuitry 730. From there, some of the correlation parameters that are now stored in the cache can be loaded into the registers of the programmable instruction correlation parameter storage circuitry 710. An advantage of this system is that the descriptor that provides the correlation parameters can be provided a long time after the instruction stream has been generated by compiling the program. In particular, this makes it possible for the correlation parameters to be provided (live) by, for instance, dynamic analysis or profiling of the program being executed. This could be carried out by the data processing apparatus itself or could be carried out by an external processing apparatus. In some examples, a number of registers are provided in order to point to multiple descriptors (e.g. one descriptor per execution or privilege level in which instructions can be executed).

There are a number of examples of triggers that can be used in order to cause the load circuitry to load the descriptor from the memory 750 into the programmable instruction correlation parameter storage circuitry 710. In some examples, a change to the value stored in the pointer circuitry 720 is one such trigger. This could occur, for instance, as part of a context switch when a new pointer is switched in. The context switch itself could also be an example of the trigger. Another example of such a trigger could be an explicit request for the descriptor to be loaded from the memory 750. This could be issued, for instance, when the descriptor is being modified in some way.

There are numerous examples of descriptors that could be provided. One example of such a descriptor is as follows:

| Field | Field Size (bits) | Description |
| --- | --- | --- |
| Header number of targets | 8 | Number of HTPs for which correlations are provided within this descriptor. |
| Header number of dependencies | 8 | Number of (Virtual address, id vector) pairs that are provided within this descriptor |
| Branch to predict #0 info | 64 | For a first target: Mask of PC matching - a 31-bit mask to specify a block of instructions for which a prediction is to be made Mask of dependency matching - a 31-bit mask to specify a block of instructions that include monitored instructions Include/exclude dependencies - 1 bit indicating whether the dependency mask includes instructions or excludes instructions from being monitored |
| Branch to predict #0 | 64 | For a first target: PC of branch to predict - the preceding "mask of PC matching" is applied to this PC value in order to specify which bits of this PC value must match for the prediction to be made |
| Branch to predict #1 info | 64 | For a second target: Mask of PC matching - a 31-bit mask to specify a block of instructions for which a prediction is to be made Mask of dependency matching - a 31-bit mask to specify a block of instructions that include monitored instructions Include/exclude dependencies - 1 bit indicating whether the dependency mask includes instructions or excludes instructions from being monitored |
| Branch to predict #1 | 64 | For a second target: PC of branch to predict - the preceding "mask of PC matching" is applied to this PC value in order to specify which bits of this PC value must match for the prediction to be made |
| dep0 | 64 | For a first dependency (monitored instruction): 47 bits that indicate at least part of a virtual address of an instruction to be monitored, and a 16 bit vector to indicate which of the targets (defined above) this dependency applies to |
| dep1 | 64 | For a second dependency (monitored instruction): 47 bits that indicate at least part of a virtual address of an instruction to be monitored, and a 16 bit vector to indicate which of the targets (defined above) this dependency applies to |
| dep2 | 64 | For a third dependency (monitored instruction): 47 bits that indicate at least part of a virtual address of an instruction to be monitored, and a 16 bit vector to indicate which of the targets (defined above) this dependency applies to |

This descriptor is aligned to a cache line of, for instance, 512 bits.

Figure 8:
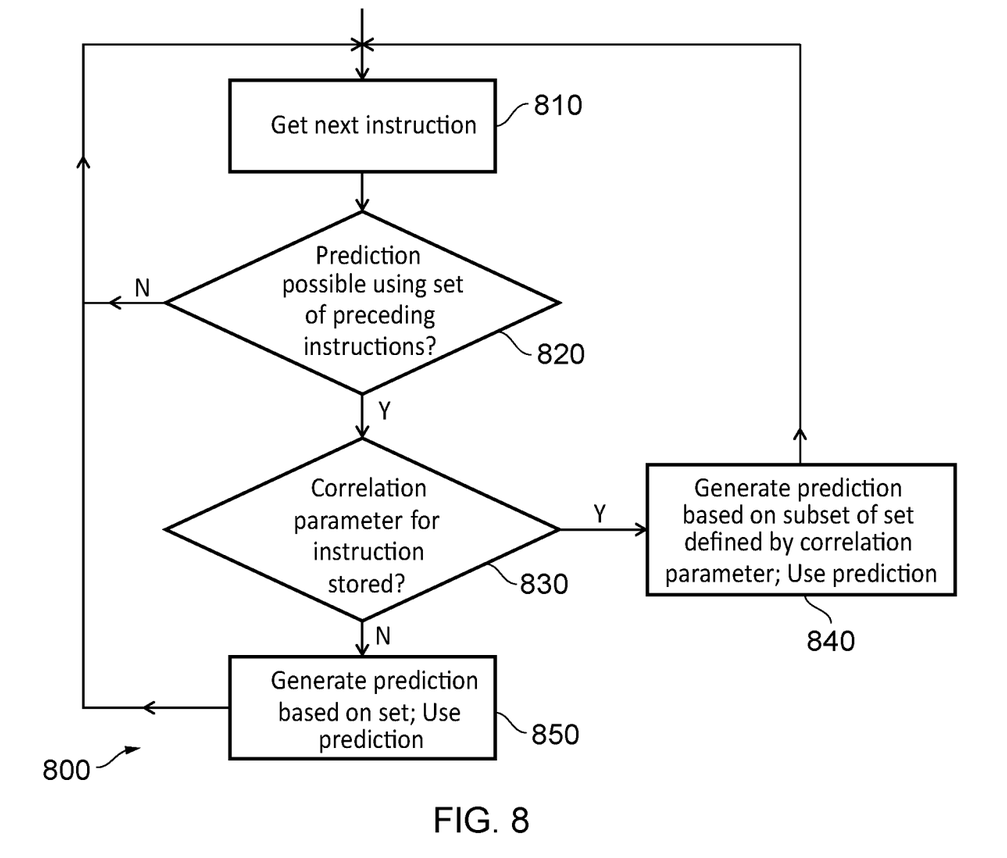
FIG. 8 illustrates, in the form of a flowchart, a method of data processing in accordance with some examples.

FIG. 8 illustrates an example of a flow chart 800 that is used to illustrate an example of data processing in accordance with some embodiments. At step 810, a next instruction from an instruction stream is obtained. At step 820, it is determined whether some form of prediction is possible using a set of instructions such as preceding instructions. This could be a set of all instructions, or could be a set of specific instructions (e.g. as used by a global history register). The identity of such a set is stored in, for instance, storage circuitry after having been determined. If no such prediction is possible, then the process returns to step 810. If prediction (e.g. branch prediction, data prediction, prefetching prediction) is possible, then at step 830 it is determined whether a correlation parameter for the current instruction as an HTP instruction is stored in the programmable instruction correlation parameter storage circuitry 150. If not, then a prediction is generated based on the set of instructions that was previously identified (e.g. stored in the storage circuitry). Having generated this prediction, the prediction is used to execute the current instruction and the process returns to step 810. If, at step 830, a correlation parameter is stored for the current instruction as an HTP instruction, then at step 840 a prediction is generated based on the subset of the set of instructions defined by the correlation parameter. The prediction is then used in the execution of the instruction. This is achieved by refining the set of instructions that are identified in the storage circuitry to a subset of those instructions.

Accordingly, the above description illustrates an example in which prediction circuitry is given one or more "hints" in order to refine the set of instructions for which a prediction for another instruction would ordinarily be made. These hints take the form of explicit relationships between instructions in the instruction stream. By providing hints, it is possible for the prediction circuitry to disregard noise that can be generated by variable length loops. Furthermore, by providing hints in this manner, as opposed to a state of a training or machine learning algorithm, it is possible to simply filter the instructions that are considered for making predictions rather than having to perform more complicated machine learning algorithms Correlation parameters, which identify the relationships, can be obtained through a variety of techniques such as by static or dynamic analysis, which may be performed by an external apparatus. They can then be provided to the data processing apparatus by using a shared storage (and descriptors) or by the use of instructions within the instruction stream. By disregarding the noise, a more consistent relationship can be determined between relevant instructions and instructions for which the prediction is to be made. This makes it possible to more reliably produce predictions for HTP instructions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   prediction circuitry to store, with respect to each of a plurality of predictable instructions in a stream, an absolute or relative address of each instruction of a set of monitored instructions in the stream, and to use at least one of the absolute or relative address of each instruction of the set of monitored instructions of each of the predictable instructions to generate predictions for the predictable instructions;
   processing circuitry to receive the predictions from the prediction circuitry and to execute the predictable instructions in the stream using the predictions; and
   programmable instruction correlation parameter storage circuitry to store a given correlation parameter indicative of a correlation between a given predictable instruction of the predictable instructions in the stream and a subset of the set of monitored instructions of the given predictable instruction, to assist the prediction circuitry in generating the predictions, wherein:
   the programmable instruction correlation parameter storage circuitry is adapted to store the given correlation parameter by storing a reference to the given predictable instruction and an absolute or relative address of each instruction of the subset of the set of monitored instructions, and
   if the programmable instruction correlation parameter storage circuitry is currently storing the given correlation parameter, the prediction circuitry is adapted to generate a given prediction relating to the given predictable instruction based on an outcome of each instruction of the subset of the set of monitored instructions indicated by the absolute or relative address of each instruction of the subset of the set of monitored instructions,
   otherwise, the prediction circuitry is adapted to generate the given prediction relating to the given predictable instruction based on the absolute or relative address of each instruction of the set of monitored instructions of the given predictable instruction.

2. The data processing apparatus according to claim 1, wherein
   the set of monitored instructions of the given predictable instruction is a set of instructions that precede the given predictable instruction in the stream.

3. The data processing apparatus according to claim 1, wherein
   the subset of the set of monitored instructions is a strict subset of the set of monitored instructions of the given predictable instruction.

4. The data processing apparatus according to claim 1, wherein
   the subset of the set of monitored instructions excludes those of the set of monitored instructions of the given predictable instruction that least strongly affect the given prediction.

5. The data processing apparatus according to claim 1, wherein
   the given correlation parameter is derived externally to the data processing apparatus.

6. The data processing apparatus according to claim 1, wherein
   the given correlation parameter is derived by static analysis of the predictable instructions.

7. The data processing apparatus according to claim 1, wherein
   the given correlation parameter is derived by profiling of the predictable instructions.

8. The data processing apparatus according to claim 1, wherein
   the prediction circuitry comprises control flow prediction circuitry;
   the predictable instructions comprise control flow instructions; and
   the predictions are generated based on a set of the control flow instructions in the stream.

9. The data processing apparatus according to claim 8, wherein
   the predictions are generated based on a global history register that comprises an indication of outcomes of the set of the control flow instructions.

10. The data processing apparatus according to claim 1, wherein
    the prediction circuitry comprises branch prediction circuitry;
    the predictable instructions comprise branch instructions; and
    the predictions are generated based on a set of the branch instructions in the stream.

11. The data processing apparatus according to claim 10, wherein
    the branch prediction circuitry comprises:
       instruction branch prediction circuitry to generate the given prediction relating to the given predictable instruction based on the subset of the set of monitored instructions; and
       further instruction branch prediction circuitry to generate the given prediction relating to the given predictable instruction based on the set of monitored instructions of the given predictable instruction.

12. The data processing apparatus according to claim 1, wherein
    the prediction circuitry comprises data prediction circuitry; and
    the predictions are of data that is loaded or stored by the predictable instructions.

13. The data processing apparatus according to claim 1, wherein the processing circuitry comprises prefetch circuitry to prefetch data from a storage circuitry;

the prediction circuitry comprises prefetch training circuitry to train the prefetch circuitry;

the predictable instructions are memory access instructions; and the predictions are of an address at which a load or store operation is to be performed by the memory access instructions.

14. The data processing apparatus according to claim 1, comprising:

further execution circuitry, responsive to one or more correlation parameter-providing instructions in the stream, to store the given correlation parameter in the programmable instruction correlation parameter storage circuitry.

15. The data processing apparatus according to claim 14, wherein at least one of the one or more correlation parameter-providing instructions comprises a field to specify a reference to at least one of the given predictable instruction and the subset of the set of monitored instructions.

16. The data processing apparatus according to claim 1, comprising:

correlation parameter pointer storage circuitry to provide a pointer to a location where the given correlation parameter is provided; and, wherein in response to a trigger, the location is accessed based on the pointer and the given correlation parameter is loaded into the programmable instruction correlation parameter storage circuitry.

17. The data processing apparatus according to claim 16, wherein prediction circuitry is adapted to store a plurality of correlation parameters at the location;

in response to the trigger, at least some of the plurality of correlation parameters are accessed; and the data processing apparatus comprises cache circuitry to store the at least some of the plurality of correlation parameters in response to the at least some of the plurality of correlation parameters being accessed.

18. A method of data processing comprising:

storing, with respect to each of a plurality of predictable instructions in a stream, an absolute or relative address of each instruction of a set of monitored instructions in the stream;

generating predictions relating to the predictable instructions in the stream, wherein the predictions are generated based on the set of monitored instructions of each of the predictable instructions;

receiving the predictions and executing the predictable instructions in the stream using the predictions;

storing a given correlation parameter indicative of a correlation between a given predictable instruction of the predictable instructions in the stream and a subset of the set of monitored instructions of the given predictable instruction, to assist generation of the predictions, wherein the given correlation parameter is stored by storing a reference to the given predictable instruction and an absolute or relative address of each instruction of the subset of the set of monitored instructions;

the method further comprising:

detecting whether the given correlation parameter is currently stored; and in response to detecting that the given correlation parameter is currently stored, generating a given prediction relating to the given predictable instruction based on an outcome of each instruction of the subset of the set of monitored instructions indicated by the absolute or relative address of each instruction of the subset of the set of monitored instructions, otherwise, generating the given prediction relating to the given predictable instruction based on the absolute or relative address of each instruction of the set of monitored instructions of the given predictable instruction.

* * * * *